United States Patent
Ingam et al.

(10) Patent No.: US 11,745,931 B2
(45) Date of Patent: Sep. 5, 2023

(54) COOLING ELEMENTS AND COOLING ASSEMBLIES COMPRISING SAME

(71) Applicant: GREEN CHILLY LIMITED, London (GB)

(72) Inventors: Philip Robert Ingam, London (GB); Stephen Marshall-Rees, Swansea (GB)

(73) Assignee: GREEN CHILLY LIMITED, London (GB)

( * ) Notice: Subject to any disclaimer, the term of this patent is extended or adjusted under 35 U.S.C. 154(b) by 44 days.

(21) Appl. No.: 15/733,027

(22) PCT Filed: Oct. 18, 2018

(86) PCT No.: PCT/EP2018/078549
§ 371 (c)(1),
(2) Date: Apr. 22, 2020

(87) PCT Pub. No.: WO2019/081337
PCT Pub. Date: May 2, 2019

(65) Prior Publication Data
US 2021/0221594 A1    Jul. 22, 2021

(30) Foreign Application Priority Data

Oct. 23, 2017  (GB) .................................. 1717363.4

(51) Int. Cl.
*B65D 81/18*        (2006.01)
*A47J 41/00*        (2006.01)
*F25D 3/08*         (2006.01)

(52) U.S. Cl.
CPC .......... *B65D 81/18* (2013.01); *A47J 41/0038* (2013.01); *F25D 3/08* (2013.01)

(58) Field of Classification Search
CPC ............... A47J 41/0038; A47J 41/0044; B65D 81/2092; B65D 81/2061; B65D 81/00;
(Continued)

(56) References Cited

U.S. PATENT DOCUMENTS 4,908,248 A * 3/1990 Nakashima et al. ...... F25D 3/08
                                                      62/371
5,697,961 A * 12/1997 Kiamil ...................... A61F 7/00
                                                      607/108
(Continued)

FOREIGN PATENT DOCUMENTS

EP        526928 A1    2/1993
EP       1293738 A1    3/2003
(Continued)

OTHER PUBLICATIONS

Engineering Toolbox 2003. Solids, Liquids and Gases: Thermal Conductivities https://www.engineeringtoolbox.com/thermal-conductivity-d_429.html (Year: 2003).*
(Continued)

*Primary Examiner* — Elizabeth J Martin
*Assistant Examiner* — Dario Antonio Deleon
(74) *Attorney, Agent, or Firm* — Dorsey & Whitney LLP (57) ABSTRACT

A cooling element for cooling a body, comprising a heat conduction layer coterminous with a proximal side of the cooling element, a heat retardant layer coterminous with a distal side of the cooling element, and a heat sink volume disposed between the heat conduction and heat retardant layers, extending from a proximal boundary with the heat conduction layer to a distal boundary with the heat retardant layer. The heat sink volume comprises a porous material including a first substance; and the heat conduction layer comprises a porous material including a second substance. The first and second substances have thermal properties such that the first substance will solidify at a first temperature, the second substance being in the liquid state at the first temperature. The heat retardant layer has a lower mean thermal conductivity than the heat conduction layer.

20 Claims, 8 Drawing Sheets

(58) Field of Classification Search
CPC ............... B65D 81/18; F25D 2303/085; F25D 2303/0822; F25D 2303/0841; F25D 3/08; C09K 5/06

See application file for complete search history.

(56) References Cited

U.S. PATENT DOCUMENTS

| | | | | |
|---|---|---|---|---|
| 6,266,972 | B1* | 7/2001 | Bostic | F25D 3/08 62/371 |
| 7,240,514 | B2* | 7/2007 | Gary | F25D 3/08 62/457.5 |
| 9,078,742 | B2* | 7/2015 | Quincy et al. | F25D 5/00 62/4 |
| 2011/0185764 | A1* | 8/2011 | Kelly | F25D 3/08 62/457.2 |
| 2015/0096995 | A1* | 4/2015 | Cunningham | B65D 81/38 |
| 2018/0265274 | A1* | 9/2018 | Damarell et al. | B65D 81/26 |

FOREIGN PATENT DOCUMENTS

| | | |
|---|---|---|
| EP | 3054243 A1 | 8/2016 |
| FR | 2843190 A1 | 2/2004 |
| JP | S6467579 A | 3/1989 |
| WO | 2006123931 A2 | 11/2006 |

OTHER PUBLICATIONS

Study on Heat and Mass Transfer During Urea Prilling Process (Year: 2012).*

International Search Report and Written Opinion dated Jan. 18, 2019, in related PCT Application No. PCT/EP2018/078549.

UK Search Report dated Apr. 24, 2018, in related UK Application No. 1717363.4, 5 pgs.

* cited by examiner

COOLING ELEMENTS AND COOLING ASSEMBLIES COMPRISING SAME

FIELD

This disclosure relates generally to cooling elements, and assemblies and containers comprising the cooling elements; particularly but not exclusively to portable cooling assemblies for cooling frozen or chilled items.

BACKGROUND

EP 3 054 243 A1 discloses a beverage chiller including a first and second cylinders, each including a respective sidewall defined by respective inner and outer surfaces. The diameter of the second cylinder is less than a diameter of the first cylinder so as to fit within the first cylinder with the inner surface of the first cylinder confronting the outer surface of the second cylinder, to define a first reservoir between the first and second cylinders for receiving a beverage to be chilled. The second cylinder further defines a chamber for receiving a chilling medium.

There is a need for cooling elements and assemblies, which may cool goods or maintain chilled or frozen goods in their chilled states. For example, there is a need for cooling or keeping cooled, chilled or frozen items, such as consumable or perishable items, including, but not limited to food, drinks, pharmaceutical products, medical products, cosmetic products, healthcare products, and the like. It may be preferable for the cooling elements and cooling assemblies to be environmentally friendly, and/or to be relatively simple to manufacture and use.

SUMMARY

According to a first aspect, there is provided a cooling element, comprising a heat conduction layer coterminous with a proximal side of the cooling element, a heat retardant layer coterminous with a distal side of the cooling element, and a heat sink volume disposed between the heat conduction and heat retardant layers, extending from a proximal boundary with the heat conduction layer to a distal boundary with the heat retardant layer; in which the heat sink volume comprises a porous material including a first substance; the heat conduction layer comprises a porous material including a second substance; the first and second substances having thermal properties such that the first substance will solidify at a first temperature less than 20° C., the second substance being in the liquid state at the first temperature; and the heat retardant layer has a lower mean thermal conductivity than the heat conduction layer.

The cooling element of the first aspect is for cooling a body and is configured such that when the proximal side of the cooling element contacts a surface of the body in use, the heat conduction layer will conduct heat from the body and into the heat sink volume more rapidly than heat is conducted through the heat retardant layer and into the heat sink volume, from the distal side of the cooling element.

Viewed from a second aspect, there is provided a cooling assembly comprising one or more cooling element as defined in the first aspect, and a container for carrying the body.

Viewed from a third aspect, there is provided a method of cooling a body, the method including providing a cooling element according to the first aspect; reducing the temperature of the heat sink volume of the cooling element to less than the first temperature, and arranging the cooling element against a surface of the body, with the proximal side of the cooling element being in contact with the side surface of the body.

According to the method of the third aspect, the cooling element may be arranged within a cooling assembly according to the second aspect. The body to be cooled may be housed within a container, in which case the cooling element is suitably arranged between the body and a surface of the container housing the body.

The term cooling is primarily intended to mean reducing the temperature of a body by a desired amount. However, in some embodiments, the term cooling may also mean retaining a previously cooled body at, or within, 5° C., preferably within 2° C., of that temperature.

Various compositions and arrangements of cooling elements and containers, and method of using these, are envisaged by this disclosure, of which the following are non-limiting and non-exhaustive examples.

The cooling element may be sufficiently flexible to be capable of curving in a range of arcs, in response to being placed against a curved surface of the body. In some embodiments, this may be achieved by the heat sink volume being formed of a plurality of heat sink elements, which may be arranged discontinuously alongside each other. For example, the heat sink volume may comprise a plurality of elongate heat sink elements, arranged substantially parallel to each other (along their longitudinal axes); the heat sink elements may or may not contact each other. Such arrangements may permit the cooling element to be curved about an axis that is substantially parallel to the longitudinal axes of the heat sink elements, allowing the cooling element to be placed against curved surface, such as the side of a bottle or a beverage can, even when the first substance is frozen. In another embodiment, the heat sink volume may comprise a plurality of heat sink elements arrange on supportive sheet, for example on the heat conduction layer or the heat retardant layer. In such an embodiment, the plurality of heat sink elements may be arranged in a geometric pattern, such as a series of polygonal shaped elements (for example, triangular, square, pentagonal, hexagonal or octagonal shaped elements) arranged in an regular array.

The heat sink volume may comprise any number of heat sink elements according to the desired application. For example, the heat sink volume may comprise at least about 2, or at least about 5, or at least about 10 heat sink elements The heat sink volume may comprise at most about 100, or at most about 50 heat sink elements. The heat sink volume may comprise from 2 to 100 heat sink elements, for example from 2 to 50 heat sink elements or from 5 to 15 heat sink elements. In other embodiments, the heat sink volume may comprise a single heat sink element.

The heat sink volume is the sum of the volumes of all the heat sink elements, in embodiments comprising a plurality of heat sink elements.

Suitably, the heat sink volume is sufficient to reduce the temperature of the body from an initial temperature to a desired temperature within a desired time period.

Suitably, the desired time period is around 10 minutes, or around 20 minutes or around 30 minutes. For example, the desired time period may be from around 10 minutes to around 30 minutes.

The initial temperature and the desired temperature will depend upon the particular application and the body to be cooled or retained chilled. For example, the initial temperature may be around 15° C., around 20° C., around 25° C., around 30° C. or around 40° C. The desired temperature may be around 30° C., around 20° C., around 15° C., around 10° C., or around 5° C.

The first substance of the heat sink volume may be frozen. The first substance of the heat sink volume may be partially frozen.

The body to be cooled may be a fluid or solid material, or a mixture thereof. If the body is a fluid, it is preferably contained in any suitable vessel or container. A body comprising a solid material may be contained in a vessel or container or need not be.

The heat sink volume may be determined based on a volume of the body to be cooled, and the amount of heat that is desired to be removed. While not wishing to be bound by a particular theory, the greater the heat sink volume, the greater the maximum quantity of heat that may be expected to be absorbed by the heat sink volume (all else being equal). It is expected that the greater the heat sink volume, the greater the volume of the body that can be cooled; and or the more rapidly the body may be cooled; and/or the greater the temperature by which the body may be reduced.

In some embodiments, the heat sink volume and the heat conduction layer may be configured and arranged such that the area of the proximal boundary between them is sufficiently great such that a desired quantity of heat can be conducted from the body to the heat sink volume within a desired period of time. In examples where the heat sink volume comprises a plurality of heat sink elements, the area of the proximal boundary is the total combined area of all the proximal boundaries between all the respective heat sink elements and the heat conduction layer. While not wishing to be bound by a particular theory, the greater the area of the proximal boundary, the more rapidly heat is expected to be transferred from the heat conduction layer to the heat sink volume (all else being equal). The area of the proximal boundary may be expected to limit the rate of heat conduction from the heat conduction layer to the heat sink volume.

The heat conduction layer may comprise a sheet material. The heat retardant layer may comprise a sheet material. In some embodiments, the heat conduction layer and the heat retardant layer each comprise or consist of a sheet, in which the heat conduction layer is attached to a proximal side of the heat sink element by means of adhesive material and the heat retardant layer is attached to a distal side of the heat sink element by means of adhesive material. Where the heat sink volume comprises or consists of one or more heat sink elements, and the heat conduction layer and the heat retardant layer each comprise or consist of a sheet, the heat conduction layer is attached to respective proximal sides of each of a plurality of heat sink elements by means of adhesive material and the heat retardant layer is attached to respective distal sides of each of a plurality of heat sink elements by means of adhesive material. The heat sink element or elements may be said to be sandwiched between the heat conduction layer and the heat retardant layer.

The first temperature is less than 20° C., for example, less than 18° C., less than 15° C. The first temperature may be as low as 0° C.

In some embodiments, the first substance may comprise water in the liquid state, when at a temperature greater than the first temperature, or the solid state, when frozen as ice at a temperature less than the first temperature. In other embodiments the first substance may consist essentially of water in the liquid state when at a temperature greater than the first temperature, or the solid state, when frozen as ice at a temperature less than the first temperature.

In certain examples, the first substance may be an aqueous solution, or may comprise or consist essentially of a substance other than water, such as certain gels. For example, the first substance may comprise or consist essentially of a biodegradable (and/or compostable) gel or agar, such as may be derived from certain kinds of algae.

In some embodiments, the first substance may comprise a combination of water and an a gel or agar.

In some examples, the second substance may comprise or consist essentially of an aqueous solution; for example, a solution of sodium chloride in water. In some examples, the content of salt in the second substance may be substantially at the saturation level when at the first temperature, or at a concentration substantially less than the saturation level.

The second substance freezes at a second temperature. The second temperature may depend on the content of salt or other solute comprised therein. In some examples, the second substance, when in a liquid state (at a temperature greater than the second temperature) may establish wetting contact with the body to be cooled. Where the body to be cooled has a contact surface of glass, plastic, or metal comprising aluminium, tin, steel, or paper, or other materials comprise a wetting contact with the second substance suitably has the effect of the second substance establishing a good thermal contact with the body, thus promoting the rapid conduction of heat from the body towards the heat sink volume.

In some embodiments, the volume of the heat conduction layer may be substantially less than the heat sink volume, and/or the volume or the second substance may be substantially less than the volume of the first substance.

In some examples, the heat retardant layer may be substantially free of any liquid phase. For example, the heat retardant layer may be substantially free of any liquid phase up to a temperature of 50° C., or 70° C. or 100° C. In other words, the heat retardant layer may be substantially dry up to at least this temperature. The heat retardant layer may be sufficiently thick, and have a sufficiently low thermal conductivity that a user can comfortable hold it in their bare hand in use, when the second substance in the heat sink is frozen.

In some examples, the porous material of the heat conduction layer, and/or the porous material of the heat sink volume, and/or the heat retardant layer may be biodegradable and/or compostable. In various examples, the porous material of the heat conduction layer, and/or the porous material of the heat sink volume, and/or the heat retardant layer may comprise or consist essentially of at least one of paper, cardboard, hemp fibres, bamboo fibres, or wood-pulp material.

In some examples, the porous material of the heat conduction layer, and/or the porous material of the heat sink volume, and/or the heat retardant layer may comprise an enzyme or other material to promote faster degradation of the cooling element upon disposal.

The mean thickness of heat conduction layer may be at least about 0.5 mm, or at least about 1 mm. The mean thickness of the heat conduction later may be at most about 5 mm, or at most about 3 mm, or at most about 2 mm. The mean thickness of the heat conduction later may be from 0.5 to 5 mm, or from 0.5 to 3 mm, or from 1 to 2 mm.

The mean thickness of heat retardant layer may be at least about 1 mm, or at least about 2 mm. The mean thickness of heat retardant layer may beat most about 15 mm, or at most about 10 mm, or at most about 5 mm. The mean thickness of heat retardant layer may be from 1 to 15 mm, or from 1 to 10 mm or from 2 to 5 mm.

The pores of the heat conduction layer may be substantially filled with the second substance. Alternatively, the pores of the heat conduction layer may be partly filled with the second substance, and include air voids. The content of the second substance within the porous material may affect the rate at which heat can be conducted from the body to the heat sink volume; in other words, the rate at which heat can be conducted from the body may be determined by the amount of second substance within the pores, and, where present, the content of air or other substance within the pores.

The pores of the porous material in the heat sink volume may be substantially filled with the first substance. Alternatively, the pores of the porous material in the heat sink volume may be partly filled with the first substance and include air voids.

The porous material comprised in the heat sink volume, and/or in the heat conduction layer, may have open porosity, or closed porosity, or a combination of open and closed porosity.

In some examples, a cooling element assembly may be provided in kit form, comprising the heat conduction layer, the one or more heat sink elements, and the heat retardant layer, in non-assembled form. In some examples, the kit may include the porous material for the heat sink volume, substantially free of the first substance; and/or porous material for the heat conduction layer, substantially free of the second substance. The first and/or the second substance may be provided in separate containers as part of the kit, such that a user may impregnate the porous material for the heat sink volume with the first substance; and/or the user may impregnate the porous material for the heat conduction layer with the second substance in preparation for use.

In some examples, the body to be cooled may comprise a volume of a substance, such a liquid, gas, and/or solid, and the volume of the first substance may be sufficiently large to be capable of absorbing enough heat from the body to reduce the temperature of the body by at least 5° C., from an initial temperature of 20° C. to 40° C. Some example methods of using the cooling element may include providing a cooling element such that the heat capacity of the heat sink volume is sufficiently great to reduce the temperature of the body by at least 5° C., from an initial temperature of around 20° C. to 40° C. For example, cooling elements comprising a range of different heat sink volumes may be available, and a cooling element may be selected dependent on the materials comprised in the body, and/or the volume of one or more materials comprised in the body, and/or the temperature of the body in use, such that the that sink volume can absorb a sufficient quantity of heat from the body to maintain the desired temperature of the body in use, for a desired period of time. For example, the volume of the first substance may be sufficiently large to be capable of absorbing enough heat from a volume of water, or a volume of liquor comprising water and alcohol, to reduce the temperature of the water (or liquor) by at least about 5° C., from an initial temperature of about 20° C. to about 30° C.; in which the volume of the water (or the liquor) may be at least about 250 ml, or at least about 340 ml, or at least about 500 ml; and/or at most about 2,000 ml, or at most about 1,000 ml, or at most about 750 ml.

In some examples, the cooling element may be configured, and may comprise materials, such that the body can be cooled from about 24° C. to about 15° C. within a period of about 10 to 20 minutes; for example, within about 15 minutes.

In some examples of cooling assemblies, the container may be configured for accommodating more than one body, such as one or more bottle, and/or can. The container may comprise a carrier means, such as one or more handle. Alternatively, the cooling assembly may be provided in a sheet for wrapping around a body to be cooled.

BRIEF DESCRIPTION OF THE DRAWINGS

Non-limiting example arrangements of chiller devices will be described with reference to the accompanying drawings, of which

FIG. 5A-5E shows various views of various component parts of an example cooling assembly.

DETAILED DESCRIPTION OF EXAMPLE EMBODIMENTS

Figure 1:
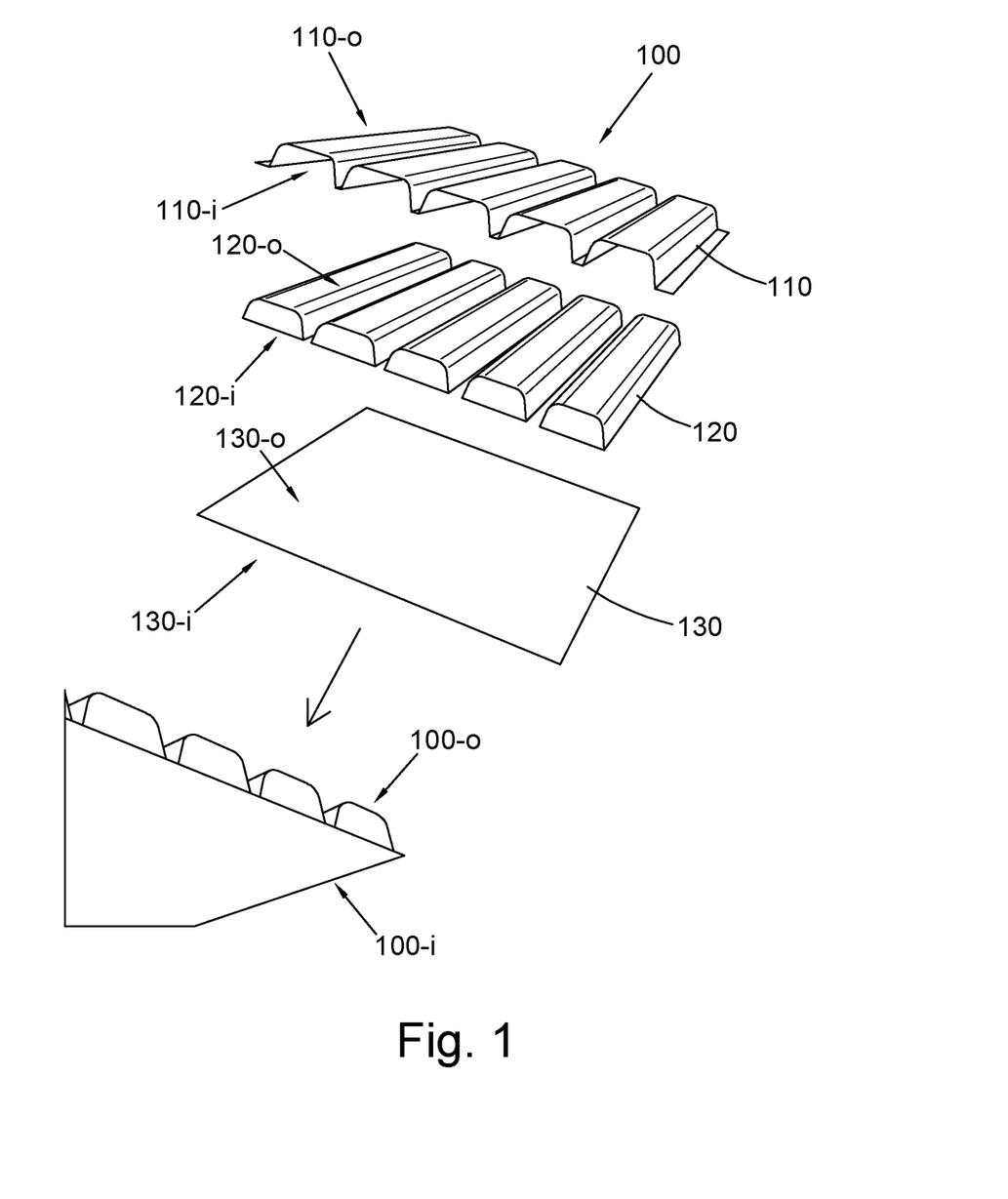
FIG. 1 shows a schematic exploded view of a portion of an example cooling element, as well as a perspective view of a portion of the cooling element, assembled as for use.

With reference to FIG. 1-FIG. 5E, example cooling elements 100 may comprise a heat conduction layer 130, a plurality of elongate heat sink bars 120, and a heat retardant layer 110 (which may also be referred to as a thermal insulation layer). With particular reference to FIG. 1, the heat conduction layer 130 may consist essentially of a thin (for example, 1-2 mm thick), substantially flat sheet of paper impregnated with a water-based solution (for example saline solution), a proximal (inner) side 130-i of which is intended to contact a body to be cooled (for example a bottle or can containing a beverage, not shown). The heat sink bars 120 may consist essentially of paper, or cardboard material, or other porous biodegradable (and/or compostable) material, impregnated with water, which water may be frozen or partially frozen when in use, or which water may be liquid water when in storage or transportation. In this particular example arrangement, each heat sink bar 120 has a substantially flat proximal (inner) side 120-i, which will contact a distal (outer) side 130-o of the heat conduction layer 130 when assembled, and an opposite distal (outer) side 120-o, which includes a flat surface area extending along the length of the heat sink bar 120. The distal (outer) sides 120-*o* of the heat sink bars 120 will contact a (proximal) inner side 110-*i* of the thermal barrier layer 110 when assembled for use. The thermal barrier layer 110 may be a substantially water-free (or dry) sheet of paper or cardboard, having a corrugated form that is configured to accommodate the plurality of heat sink bars 120.

When the cooling element 100 is assembled as in use, its distal (outermost) side will be at least partly defined by the distal (outer) side 110-*o* of the thermal barrier layer 110, and its proximal (innermost) side will be defined by the proximal (inner) side 130-*i* of the heat conduction layer 130. In some examples, the innermost side of the cooling element 100 will contact a drinks container, such as a drink can or bottle (or other chilled product, in general) that is intended to be cooled (or to remain cooled), and the outermost side may be held by a user. The poor thermal conductivity of the heat retardant layer 110, relative to the thermal conductivity of the heat conduction layer 130, will reduce the flux of heat from the ambient environment, including from the user's hand, to the heat sink bars 120, which may make it comfortable for the user to hold the chilled drink container, and reduce the rate at which the heat sink bars 120 heat towards the ambient temperature. In general, the longer the heat sink bars 120 can be maintained below the ambient temperature, the longer the cooling assembly 100 can function to chill the drink container (and consequently any beverage contained inside it).

The heat conduction layer 130 may comprise a porous matrix, such as fibrous material; for example, the porous matrix may comprise fibrous material such as paper or cardboard, which includes pores between the fibres. The pores may be at least partly filled with an aqueous solution of sodium chloride (NaCl). In some examples, the pores may include air bubbles, or unfilled voids, which may reduce the rate at which heat can be transported from the drink container to the heat sink bars 120, and which may be desired for reducing the rate of cooling of the drink container (or other body) and extending the period over which the drink container is maintained at temperatures below the ambient temperature. It is envisaged that that the volume of unfilled pores (that is, unfilled with aqueous solution), and the volume of saline solution within the pores can be varied according the desired heat transport behaviour of the heat conduction layer 130 in use, depending on the kind of drink in a drink container, or the circumstances of use, for example.

While wishing not to be bound by a particular theory, the temperature at which a saline solution will freeze (at a given pressure) will generally decrease as the dissolved salt content increases towards the saturation point. The freezing point of pure water is 0° C. at one atmosphere of pressure, and the freezing point of saline solution having a NaCl content can be reduced by about 1-2° C. The impregnation of saline solution in the heat conduction layer 130 is understood to promote the transport of heat from the drink container, or other body to be cooled. In use, the heat conduction layer 130 may be wrapped at least partly around, and against, a drink container (or other body) to be cooled. The saline solution should remain substantially unfrozen in use, heated by the heat being transported from the body, and may form a wetting contact with a surface of the drink container. Heat can diffuse from the body into the saline solution forming a good thermal contact with it, through the saline solution impregnated within the pores of the porous matrix of the heat conduction layer 130, and into the heat sink 120 (some saline solution may infiltrate into the heat sink elements to some extent).

The heat sink bars 120 may comprise a porous matrix, such as fibrous material; for example, the porous matrix may comprise fibrous material such as paper or cardboard, which includes pores between the fibres. The pores may be impregnated with substantially pure water between the fibres. The water may be frozen or partly frozen, in use. In other examples, the pores may contain saline solution, or some other aqueous solution, or emulsion; or the pores may contain a gel, or substantially non-aqueous medium. The porous matrix material of the heat sink bars 120, and/or the material with which the porous material is impregnated may be selected to enhance the ability of the heat sink bars 120 (or other configuration) to retain their shape as the ice melts, or the other impregnation medium liquifies, in use. The combined water content of the plurality of heat sink bars 120 may be of the order of 10 g, or 100 g; for example, the water content may be about 50 g to about 500 g. The shape of the heat sink volume may be configured according to the shape of the container, or other body, to be cooled; and/or the shape of the heat sink volume may be configured to be suitable for wrapping against surfaces having any of a range of shapes, such as curvatures. In the example illustrated in FIG. 1, the heat sink volume is in the form of a plurality of bars, such that the relative disposition of neighbouring bars can be varied depending on the shape the drink container to be cooled. In certain other examples, the heat sink volume 120 may comprise a single pre-shaped body, or a flexible sheet. In various examples, the matrix material comprised in the heat sink bars 120 may be substantially the same, or different, kind of material that is comprised in the heat conduction layer 130.

The thermal barrier sheet 110 may contain any of a wide range of materials that have a sufficiently low thermal conductivity, such that the risk of a user's hand becoming uncomfortably cold when they are holding the cooling element 100 in use; and/or such that the heat sink means 120 remains frozen for a sufficiently long period. In the example illustrated in FIG. 1, the thermal barrier sheet 110 is formed of a thin sheet of paper or cardboard that is corrugated to conform the shapes of the outer sides 120-*o* of the heat sink bars 120. In various examples, the type of material comprised in the thermal barrier layer 110 may be substantially the same, or different from, the porous matrix material comprised in the heat sink bars 120, and/or the matrix material comprised in the heat conduction layer 130.

Figure 2A:
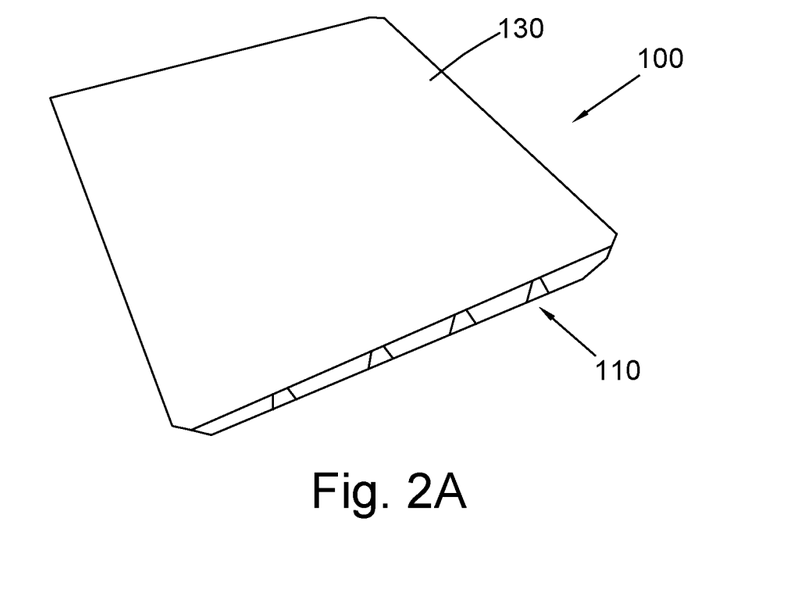
FIG. 2A shows a perspective view of an example cooling element, viewed from the proximal side.
Figure 2B:
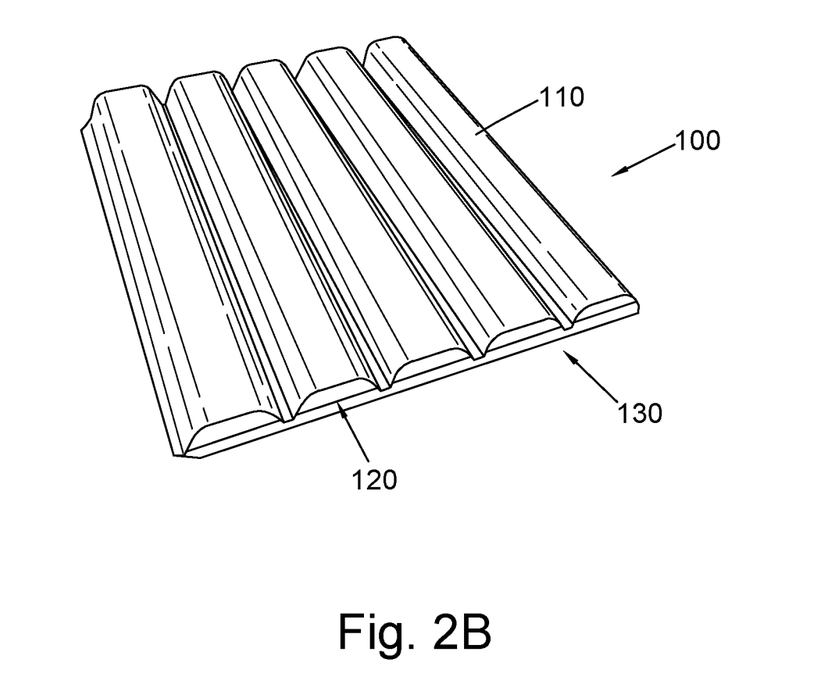
FIG. 2B shows a perspective view from the distal side of the cooling element.

With reference to FIG. 2A and FIG. 2B, an example cooling element 100 may comprise a heat conduction layer 110, a plurality of heat sink bars 120 and a thermal barrier layer 130. These layers may be attached to each other by means of adhesive material, and may have the features and characteristics as described with reference to FIG. 1.

With reference to FIGS. 3A and 3B, and FIGS. 4A-4C, example cooling assemblies may comprise a carrier 200 for containing and carrying one or two (or more than two) drink cans 300, and a pair of cooling elements 100A, 100B. The carrier 200 may formed of cardboard and have a pair of ears that include through-holes as handles, to facilitate a user carrying the carrier 200, and drink cans 300 contained by it. While the carriers 200 in each of the examples have somewhat different configurations, both comprise a containment volume of sufficient size to accommodate two drink cans (for example, 330 ml capacity drink cans) and the pair of cooling elements 100A, 100A. Each of the cooling elements 100A, 100B may be as described with reference to FIG. 1, and be capable of being formed into a semi-circular arc, such that the substantially flat proximal (inner) side 130-*i* of the heat conduction layer 130 can wrap about halfway around the cylindrical side of a drink can 300. This is facilitated by the heat sink volume 120 being in the form of separate heat sink bars, and the thermal barrier layer 110 being corrugated to accommodate the heat sink bars 120. In the illustrated example arrangements, each of the cooling elements 100A, 100B can be inserted between a respective drink can 300 and a respective end of the carrier 200, each having substantially the same semi-circular shape as the cylindrical side of the drink can 300. Prior to use, the cooling elements 100A, 100B will have been treated in a refrigerator or freezer to freeze the water or other medium impregnated into the porous matrix comprised in the heat sink bars 120. Each treated cooling element 100A, 100B can be inserted into the carrier 200, between a drink can 300 and a respective end of the containment volume of the carrier 200.

Figure 3A:
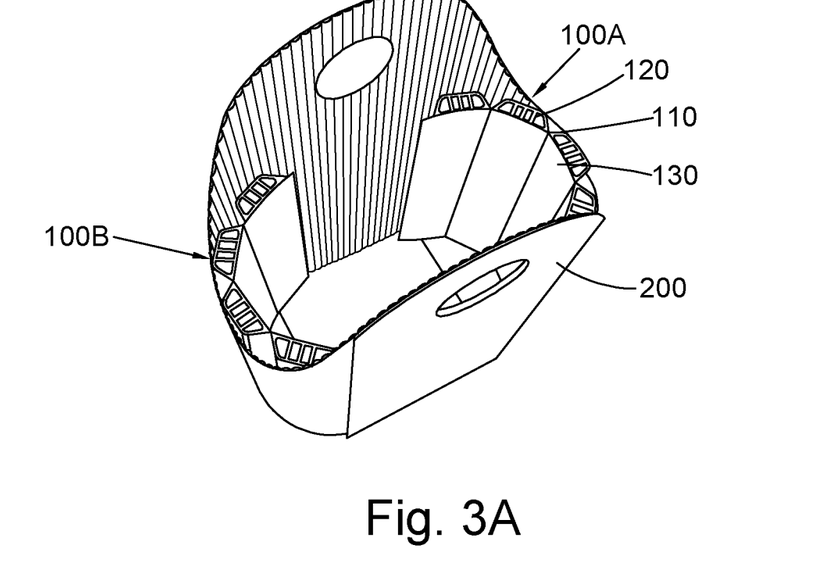
FIG. 3A shows a perspective top view of an example cooling assembly, without beverages present.
Figure 3B:
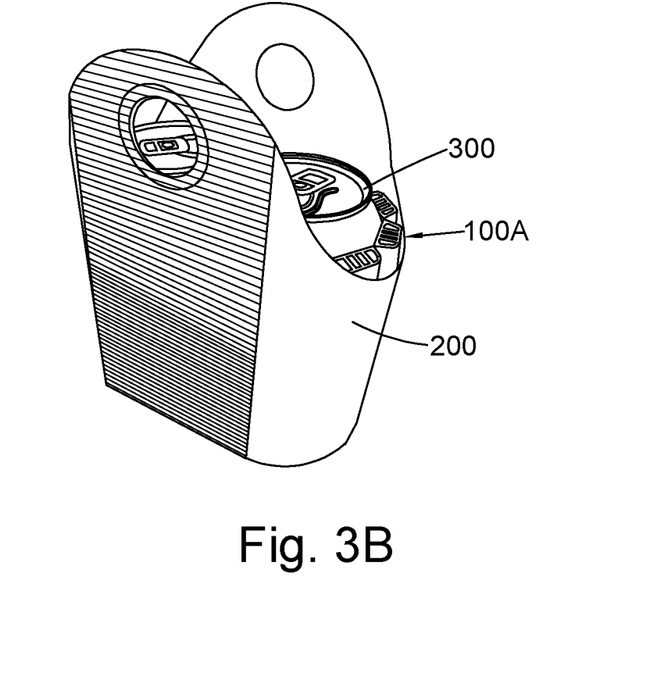
FIG. 3B shows a perspective view of the example container assembly containing two drink cans.

In the particular example shown in FIGS. 3A and 3B, each of the heat sink bars 120 includes a plurality of elongate cavities extending from one end of the heat sink bar 120 to the other. The presence of the cavities may have the aspect of reducing the amount of material within the cooling elements, and/or of achieving a desired cooling rate response.

Figure 4A:
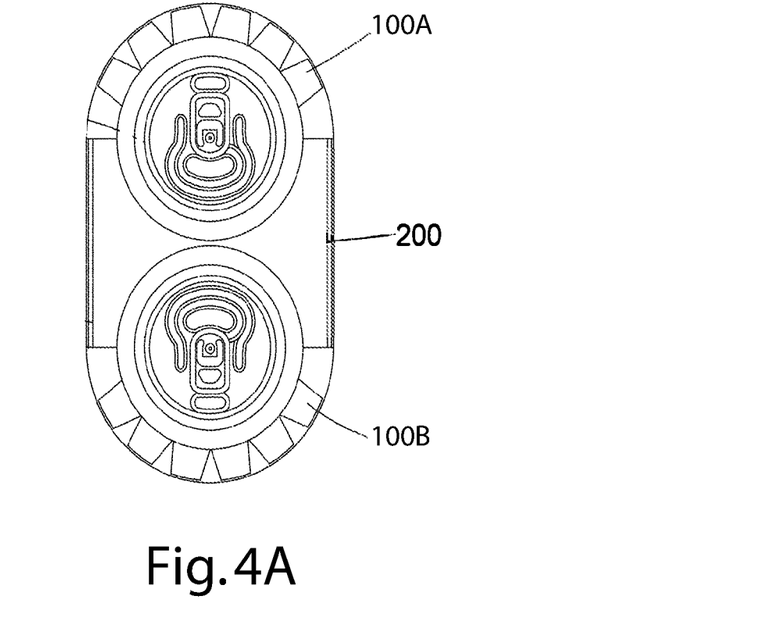
FIG. 4A shows a schematic top view of an example cooling assembly, with two drinks cans present.
Figure 4B:
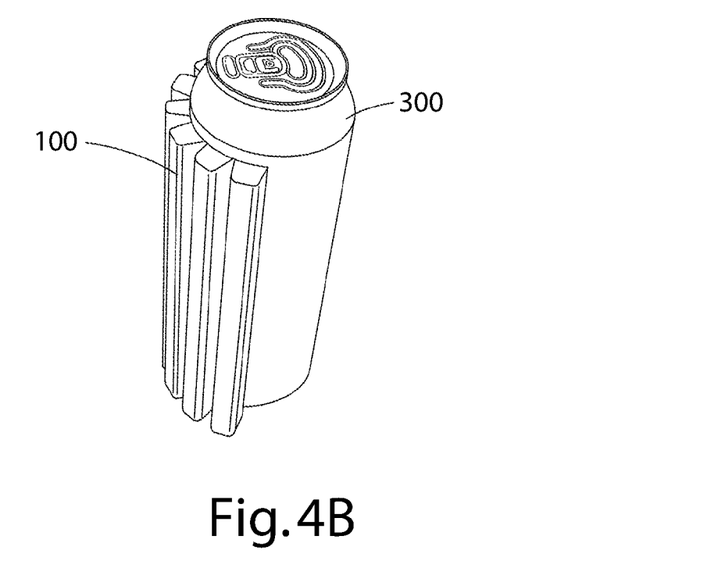
FIG. 4B shows a schematic perspective view of an example cooling element wrapped against a drink can as in use.
Figure 4C:
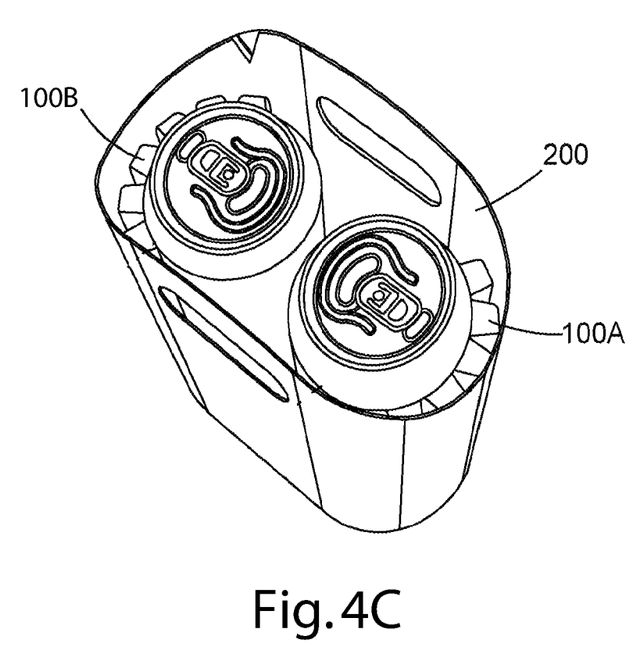
FIG. 4C shows a perspective top view of the example cooling assembly, containing two drinks cans.

In the particular example shown in FIGS. 4A-4C, each of the heat sink bars 120 has four substantially flat longitudinal sides that extend between opposite ends, in which inner and outer sides are substantially parallel to each other, and connected to each other by tapered, non-parallel sides.

Figure 5A:
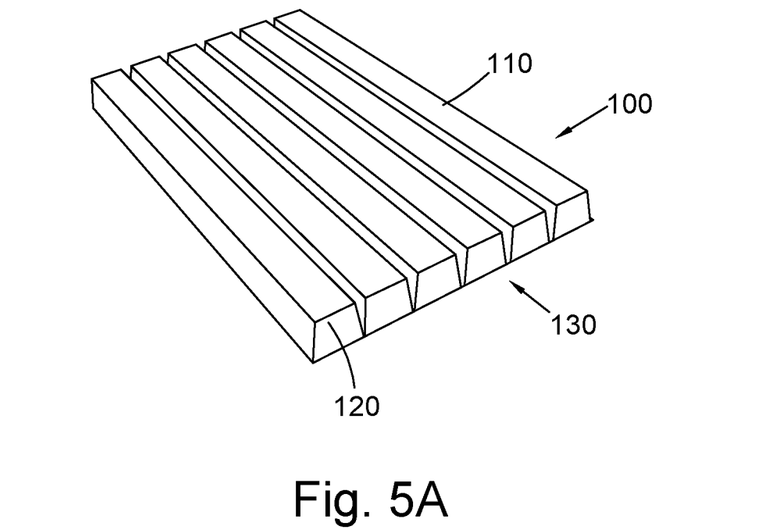
FIG. 5A shows a perspective view of a portion of an example cooling element, from the distal side.
Figure 5B:
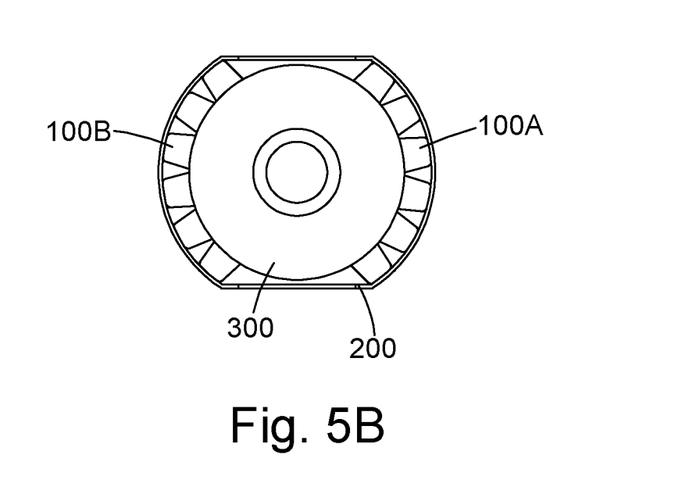
FIG. 5B shows a schematic top view of an example bottle cooler assembly, with a bottle present.
Figure 5C:
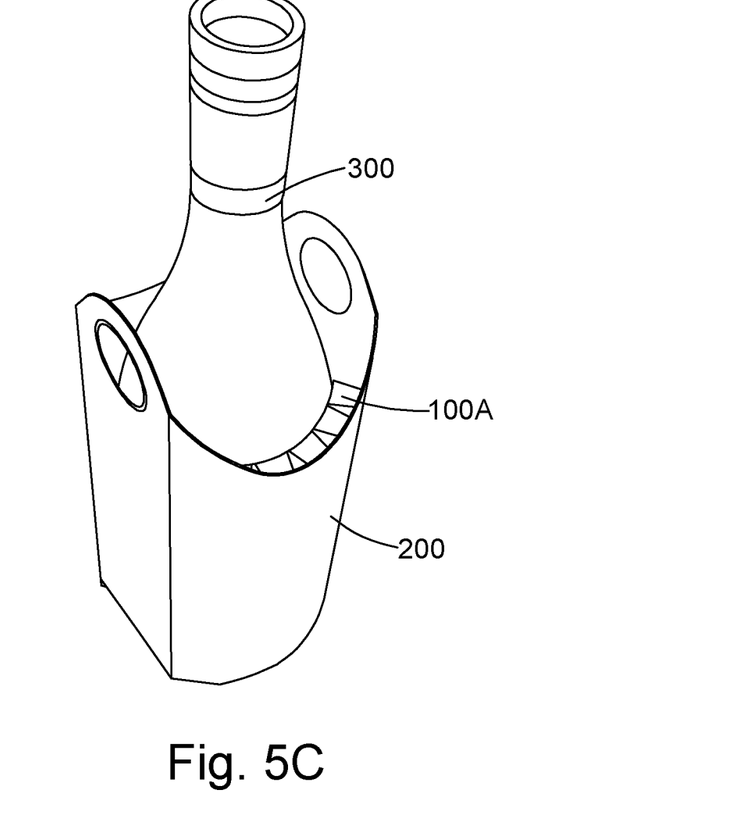
FIG. 5C shows a perspective view of the cooling assembly, containing a wine bottle.
Figure 5D:
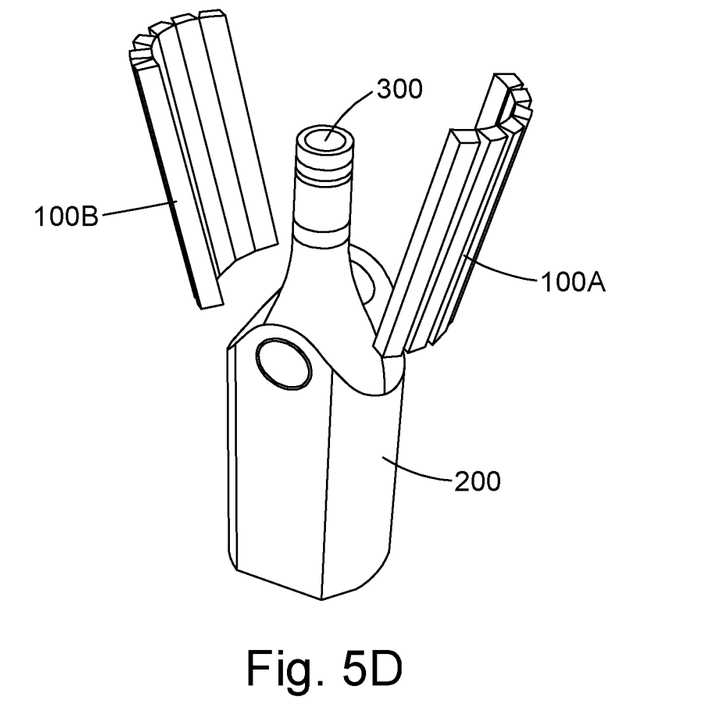
FIG. 5D shows a perspective view of the container assembly with the bottle present, in which the two example cooling elements are being removed from, or inserted into, the container.

With reference to FIG. 5A-5E, an example cooling assembly may comprise a carrier 200 for containing and carrying a bottle 300, such as a wine bottle, and a pair of cooling elements 100A, 100B. The carrier 200 may formed of cardboard and have a pair of ears that include through-holes, to form handles and facilitate a user carrying the carrier, and potentially a wine bottle contained by it. In the illustrated example, the carrier 200 may comprise a containment volume of sufficient size to accommodate the bottle 300 (for example, a 750 ml capacity bottle) and the pair of inserts 100A, 100A. Each of the cooling elements 100A, 100B may be as described with reference to FIGS. 1-4C, and be capable of formed into a semi-circular arc, such that the substantially flat inner side of the heat conduction layer 130 can wrap about halfway around the cylindrical side of a bottle 300. The heat sink bars 120 may have four substantially flat longitudinal sides that extend between opposite ends, each being substantially square, rectangular, or tapered when viewed in lateral cross-section (that is, in a plane perpendicular to the longitudinal axis of the heat-sink bar 120). As shown in FIG. 5D, each of the two cooling elements 100A, 100B can be inserted between opposite sides of the bottle 300 and a respective side of the carrier 200, each having substantially the same semi-circular shape as the cylindrical side of the bottle 300.

Figure 5E:
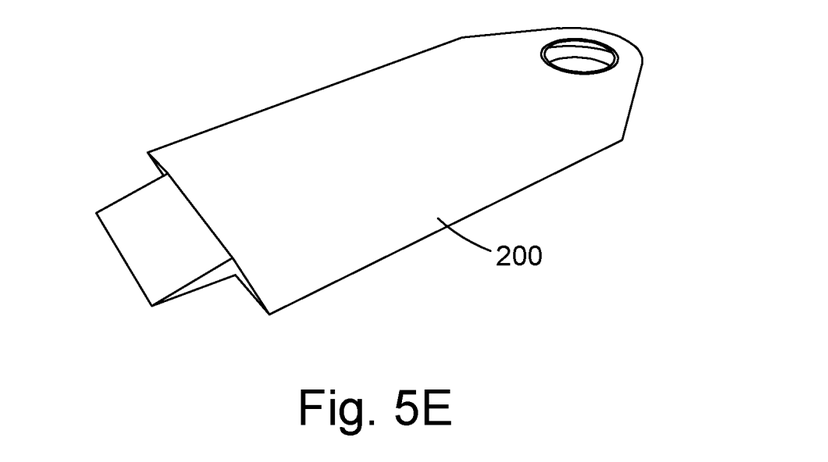
FIG. 5E shows a perspective view of an example bottle container in a compact condition for storage or transportation.

Prior to use, the cardboard carrier 200 may be provided in compact form as shown in FIG. 5E, since it may be more efficient to pack and store the carrier 200 in a flat, folded form. A user may open the carrier 200 and place a bottle 300 (or in general some other body to be cooled) into the containment volume. The carrier 200 should be configured such that the containment volume is sufficiently wide to accommodate the bottle as well as at least a pair of cooling elements 100A, 100B between respective sides of the bottle 300 and the wall of the containment volume. Each cooling element 100A, 100B can be prepared by impregnating the porous matrix with water, and then placing them in a refrigerator at a temperature below the freezing point of water for a sufficiently long period for substantially all the water to freeze. If the saline solution impregnated into the heat conduction layer 130 also freezes, then it is expected to melt before the water in the heat sink bars 120, owing to the lower freezing point of the saline solution, especially when the conduction layer 130 is placed in contact with the bottle 300 in use. The cooling element 100A, 100B can be bent into an arcuate form to match the curvature of the side of the bottle 300, and inserted between respective sides of the bottle 300 and the wall of the containment volume of the carrier 200, such that the proximal (inner) side 130-*i* of the heat conduction layer 130 is in contact with the respective side of the bottle 300. In the illustrated example, the heat sink volume 120 is in the form of a plurality of bars (six bars 120 in each cooling element 100, in this example) arranged substantially parallel to each other and connected by the heat conduction layer 130 on the proximal (inner) side 120-*i* and by the thermal barrier layer 110 on the distal (outer) side 120-*o*. This arrangement can allow the cooling element 100A, 100B to be bent sufficiently to match the curvature of the bottle 300, even when the heat sink bars 120 are frozen solid. In some examples, wine contained within the bottle 300 may be cooled from about 24° C. to about 15° C. in approximately 15 minutes.

The method of using the cooling assemblies for drink cans described with reference to FIGS. 3A-4C will be substantially the same as described with reference to FIGS. 5A-5E in connection with a wine bottle. The cardboard carriers 200 can be configured such that the same cooling elements 100A, 100B can be used in combination with a variety of drink containers, including cans and bottles; and the example cooling elements 100A, 100B may be bent into a range of curvatures, for use with various drink containers. For example, the cooling elements 100A, 100B may be used with a range of drink cans and bottles.

Certain example cooling elements may contain a relatively low content of water, and may have the aspect of promoting a sustainable environment and minimising the consumption of clean water, particularly in geographical regions in which water is relatively scarce. In various examples, it may be desirable for the amount of water, or other impregnated medium, contained within the heat sink, and/or within the heat conduction layer, to be relatively low, or to be minimised. In some examples, each cooling element may contain less than about 130 millilitres (ml) of water.

Certain example cooling elements may have a relatively low content of salt within the heat conduction layer, and/or may comprise porous matrix material (comprised in the heat conduction member, and/or the heat sink means, and/or the thermal barrier layer) that is biodegradable (and/or compostable), and may have the aspect of being readily compostable, or recycled, and environmentally friendly. In some examples, the cooling elements may be substantially entirely biodegradable (and/or compostable). Certain example cooling elements may be capable of being re-used one or more times; and in some examples, the carrier, and/or the heat sink means, and/or the thermal barrier layer, and/or the heat conduction layer may comprise or consist essentially of recycled cardboard (or other biodegradable and/or compostable material).

Various example heat sink means may be impregnated, or impregnable, with water, and have the aspect of being readily frozen by means of a domestic refrigerator. Certain example cooling elements may comprise relatively few different kinds of material, and relatively few components having relatively simple shapes, and may have the aspect of being relatively straightforward to manufacture using simple equipment, potentially consuming relatively little energy in the process.

As used herein, 'wetting' refers to the ability of a liquid to maintain contact with the surface of a solid body, resulting from intermolecular interactions when the two are brought together. Wettability may be measured by a method involving placing a drop of the liquid onto the surface of the body, and determining the angle between the surface and a plane tangent to the surface of the drop, where the surface of the drop meets the surface of the body. The angle is included within the drop, and may be referred to as the 'contact angle'. In general, the lower the contact angle (that is, the more the drop tends to spread out over the surface of the body), the greater the wettability of the liquid in relation to the material of the body; and the higher the wetting angle, (that is, the more the drop tends to adopt a shape that reduces the area of contact with the body), the lower the wettability. As used herein, a 'wetting contact' corresponds to a contact angle of less than 90° (in air).

As used herein, the phrase "consists essentially of" means "consists of, apart from a non-substantial content of practically unavoidable impurities".

What is claimed is:

1. A cooling element, comprising
   a heat conduction layer coterminous with a proximal side of the cooling element,
   a heat retardant layer coterminous with a distal side of the cooling element, and
   a heat sink volume disposed between the heat conduction and heat retardant layers, extending from a proximal boundary with the heat conduction layer to a distal boundary with the heat retardant layer; in which
   the heat sink volume comprises a porous material, the pores of which being at least partially filled with a first substance;
   the heat conduction layer is a sheet material comprising a porous material, the pores of which being at least partially filled with a second substance, the porous material forming an exterior surface of the proximal side of the cooling element such that the porous material and the second substance within the pores of the porous material contact a surface of a body to be cooled;
   the first and second substances having thermal properties such that the first substance will solidify at a first temperature less than 20° C., the second substance being in the liquid state at the first temperature; and
   the heat retardant layer has a lower mean thermal conductivity than the heat conduction layer;
   configured such that when the porous material and the second substance within the pores of the porous material of the exterior surface of the proximal side of the cooling element contacts the surface of the body as in use, the heat conduction layer will conduct heat from the body and into the heat sink volume more rapidly than heat is conducted through the heat retardant layer and into the heat sink volume, from the distal side of the cooling element.

2. The cooling element as claimed in claim 1, wherein the cooling element is configured to curve in any of a range of arcs, in response to being placed against a curved surface of the body to be cooled.

3. The cooling element of claim 1, in which the heat sink volume comprises a plurality of heat sink elements.

4. The cooling element of claim 1, in which the porous material of the heat sink volume comprises at least one of a biodegradable and compostable material.

5. The cooling element of claim 1, in which the porous material of the heat conduction layer, and the porous material of the heat sink volume, and the heat retardant layer comprise at least one of a biodegradable and compostable material.

6. The cooling element of claim 1, in which the heat retardant layer comprises at least one of a biodegradable and compostable material.

7. The cooling element of claim 1 in which at least one of the porous material of the heat conduction layer, and the porous material of the heat sink volume, and the heat retardant layer comprise at least one of a biodegradable and compostable material and at least one of the biodegradable and compostable material comprises at least one of paper, cardboard, hemp fibers, bamboo fibers, and wood-pulp material.

8. The cooling element of claim 1, in which the volume of the second substance is less than the volume of the first substance.

9. The cooling element of claim 1, in which the heat retardant layer is free of any liquid phase up to 50° C.

10. The cooling element of claim 1, in which the first substance comprises water.

11. The cooling element of claim 1, in which the second substance comprises an aqueous solution.

12. The cooling element of claim 1, in which the second substance comprises a solution of sodium chloride in water.

13. The cooling element of claim 1, in which the mean thickness of the heat conduction layer is 0.5-3 mm.

14. The cooling element of claim 1, in which the mean thickness of the heat retardant layer is 1-15 mm.

15. The cooling element of claim 1, in which the pores of the porous material of the heat conduction layer are filled with the second substance; or partly filled and include air voids.

16. A cooling assembly for cooling a body comprising:
   one or more cooling elements as claimed in claim 1, and
   a container for containing the body and the cooling element.

17. The cooling assembly as claimed in claim 16, comprising a plurality of cooling elements.

18. The cooling assembly of claim 17, in which the container is configured for accommodating more than one body.

19. A method of cooling a body, the method comprising:
   providing the cooling element of claim 1;
   reducing the temperature of the heat sink volume to less than the first temperature;
   arranging the cooling element between the body and a surface of the container, the body being housed within the container, the proximal side of the cooling element being in contact with the body.

20. The method of claim 19, further comprising:
   providing the cooling element such that the heat capacity of the heat sink volume is sufficiently great to reduce the temperature of the body by at least 5° C., from an initial temperature of around 20° C. to 40° C.

* * * * *